United States Patent
Watanabe et al.

(10) Patent No.: US 11,477,373 B2
(45) Date of Patent: Oct. 18, 2022

(54) PERIPHERY MONITORING DEVICE

(71) Applicant: AISIN CORPORATION, Kariya (JP)

(72) Inventors: Kazuya Watanabe, Anjo (JP); Tetsuya Maruoka, Okazaki (JP)

(73) Assignee: AISIN CORPORATION, Kariya (JP)

(*) Notice: Subject to any disclaimer, the term of this patent is extended or adjusted under 35 U.S.C. 154(b) by 416 days.

(21) Appl. No.: 16/621,090

(22) PCT Filed: Mar. 5, 2018

(86) PCT No.: PCT/JP2018/008408
§ 371 (c)(1),
(2) Date: Dec. 10, 2019

(87) PCT Pub. No.: WO2019/008824
PCT Pub. Date: Jan. 10, 2019

(65) Prior Publication Data
US 2020/0169662 A1    May 28, 2020

(30) Foreign Application Priority Data
Jul. 7, 2017   (JP) .............................. JP2017-133814

(51) Int. Cl.
*H04N 5/232* (2006.01)
*B60R 1/00* (2022.01)
*H04N 5/247* (2006.01)

(52) U.S. Cl.
CPC ......... *H04N 5/23238* (2013.01); *B60R 1/002* (2013.01); *H04N 5/247* (2013.01);
(Continued)

(58) Field of Classification Search
None
See application file for complete search history.

(56) References Cited

U.S. PATENT DOCUMENTS

| 6,014,608 | A | * | 1/2000 | Seo ..................... G01C 21/3602 |
| | | | | 701/515 |
| 2010/0245573 | A1 | * | 9/2010 | Gomi ..................... H04N 7/181 |
| | | | | 348/148 |

(Continued)

FOREIGN PATENT DOCUMENTS

| JP | 2010-114618 A | 5/2010 |
| JP | 2014-069629 A | 4/2014 |

(Continued)

OTHER PUBLICATIONS

International Search Report for PCT/JP2018/008408, dated May 22, 2018.

*Primary Examiner* — Stuart D Bennett
(74) *Attorney, Agent, or Firm* — Sughrue Mion, PLLC (57) ABSTRACT

A periphery monitoring device according to an embodiment includes, as an example: a processor that generates a display image obtained by viewing, from a virtual viewpoint received through an operation input unit, a point of gaze in a virtual space including a model obtained by pasting a captured image obtained by imaging a surrounding area of a vehicle in a first position of the vehicle at a first time using imaging units provided on the vehicle to a three-dimensional plane around the vehicle, and including a three-dimensional vehicle image provided in a second position of the vehicle at a second time after the first time; and outputs the display image to a display.

7 Claims, 10 Drawing Sheets

(52) U.S. Cl.
CPC ....... *B60R 2300/10* (2013.01); *B60R 2300/20* (2013.01); *B60R 2300/307* (2013.01)

(56) References Cited

U.S. PATENT DOCUMENTS

| | | | | |
|---|---|---|---|---|
| 2012/0068840 | A1* | 3/2012 | Ozaki | G09G 5/14 |
| | | | | 348/148 |
| 2012/0262580 | A1* | 10/2012 | Huebner | G06K 9/00791 |
| | | | | 348/148 |
| 2014/0218507 | A1* | 8/2014 | Watanabe | H04N 7/181 |
| | | | | 348/116 |
| 2014/0292805 | A1 | 10/2014 | Yamada et al. | |
| 2014/0333729 | A1* | 11/2014 | Pflug | H04N 13/106 |
| | | | | 348/47 |
| 2014/0347450 | A1* | 11/2014 | Han | G06T 3/0031 |
| | | | | 348/48 |
| 2015/0203035 | A1* | 7/2015 | Watanabe | G06V 20/588 |
| | | | | 382/103 |
| 2016/0009225 | A1* | 1/2016 | Watanabe | H04N 7/181 |
| | | | | 348/148 |
| 2016/0284217 | A1* | 9/2016 | Lee | B60K 31/0008 |
| 2018/0201191 | A1 | 7/2018 | Nakasho et al. | |
| 2018/0210442 | A1* | 7/2018 | Guo | G05D 1/0016 |
| 2018/0321491 | A1* | 11/2018 | Kuo | G02B 27/0103 |

FOREIGN PATENT DOCUMENTS

| | | |
|---|---|---|
| JP | 2014-197818 A | 10/2014 |
| JP | 2016-021653 A | 2/2016 |
| WO | 2014/156220 A1 | 10/2014 |
| WO | 2018/066282 A1 | 4/2018 |

\* cited by examiner

PERIPHERY MONITORING DEVICE

CROSS-REFERENCE TO RELATED APPLICATIONS

This application is national stage application of International Application No. PCT/JP2018/008408, filed Mar. 5, 2018, which designates the United States, incorporated herein by reference, and which claims the benefit of priority from Japanese Patent Application No. 2017-133814, filed Jul. 7, 2017, the entire contents of which are incorporated herein by reference.

TECHNICAL FIELD

Embodiments of the present invention relate to a periphery monitoring device.

BACKGROUND ART

Techniques have been developed in which a past front camera image is obtained as an image generated by superimposing an image representing a current vehicle or wheels on an image obtained by imaging a front side of the vehicle at a past time, and is displayed on a monitor device provided in an interior of a vehicle, and thereby, a situation surrounding the vehicle (or the wheels) is visualized to assist a driver in determining a course of the vehicle.

CITATION LIST

Patent Literature

Patent Document 1: International Publication No. 2014/156220

SUMMARY OF INVENTION

Problem to be Solved by the Invention

However, a line or lines representing an outline of the vehicle or outlines the wheels in a planar form is/are superimposed as the image representing the current vehicle or wheels on the past front camera image mentioned above. As a result, a positional relation or relations of the current vehicle or wheels with an obstacle present around the current vehicle or wheels may be difficult to be recognized.

Means for Solving Problem

A periphery monitoring device of an embodiment includes, for example: a processor configured to: generate a display image obtained by viewing, from a virtual viewpoint received through an operation input unit, a point of gaze in a virtual space including a model obtained by pasting a captured image obtained by imaging a surrounding area of a vehicle in a first position of the vehicle at a first time using imaging units provided on the vehicle to a three-dimensional plane around the vehicle, and including a three-dimensional vehicle image provided in a second position of the vehicle at a second time after the first time, and to output the display image to a display. Accordingly, with the periphery monitoring device according to the present embodiment, as an example, the positional relation between the vehicle and the obstacle can be easily recognized.

In the periphery monitoring device of the embodiments, the vehicle image is an image allowing viewing therethrough the model. Accordingly, with the periphery monitoring device according to the present embodiment, as an example, an image under a floor of the vehicle image in the virtual space can be viewed through.

In the periphery monitoring device of the embodiments, the captured image is obtained by imaging the surrounding area of the vehicle in the first position using one of the imaging units. Accordingly, with the periphery monitoring device according to the present embodiment, as an example, the positional relation between the vehicle and the obstacle therearound can be more easily recognized.

In the periphery monitoring device of the embodiments, the vehicle image is an image in which three-dimensional outlines of images of wheels included in the vehicle image are visible through an image of a vehicle body included in the vehicle image. Accordingly, as an example, the periphery monitoring device according to the present embodiment allows the positional relation between the vehicle image and the obstacle in the display image to be easily recognized based on the wheel images.

In the periphery monitoring device of the embodiments, the processor disposes, in the virtual space, an outline of the vehicle image obtained when the vehicle image is viewed from above in, the virtual space. Accordingly, as an example, the periphery monitoring device according to the present embodiment allows the positional relation between, the vehicle and the obstacle to be more easily recognized.

In the periphery monitoring device of the embodiments, the processor acquires an amount of steering of the vehicle in the second position, and includes the images of the wheels rotated by an angle corresponding to the acquired amount of steering in the vehicle image. Accordingly, with the periphery monitoring device according to the present embodiment, as an example, whether the vehicle will contact the obstacle if the vehicle travels at a current steer angle can be easily understood.

In the periphery monitoring device of the embodiments, the captured image includes an image corresponding to an area under the floor of the vehicle in the second position. Accordingly, as an example, the periphery monitoring device according to the present embodiment allows a situation under the floor of the vehicle in the second position to be checked through the display.

BRIEF DESCRIPTION OF DRAWINGS

FIG. 1 is a perspective view illustrating an example of a state in which a part of a passenger compartment of a vehicle provided with a periphery monitoring device according to a first embodiment of the present invention is viewed through;

DESCRIPTION OF EMBODIMENTS

Exemplary embodiments of the present invention will be disclosed below. Configurations of the embodiments described below, and operations, results, and effects brought about by the configurations are merely exemplary. The present invention can be achieved by any configuration other than the configurations disclosed in the following embodiments, and can attain at least one of various types of effects and secondary effects based on the basic configurations.

A vehicle provided with a periphery monitoring device (periphery monitoring system) according to the embodiments may be an automobile (internal combustion engined automobile) using an internal combustion engine (engine) as a driving source, an automobile (such as an electric vehicle or a fuel cell vehicle) using an electric motor (motor) as a driving source, or an automobile (hybrid vehicle) using both the engine and the motor as driving sources. The vehicle can be provided with any of various types of transmissions, and various types of devices (such as systems and components) required for driving the internal combustion engine and/or the electric motor. For example, systems, numbers, and layouts of devices for driving wheels on the vehicle can be variously set.

First Embodiment

Figure 1:
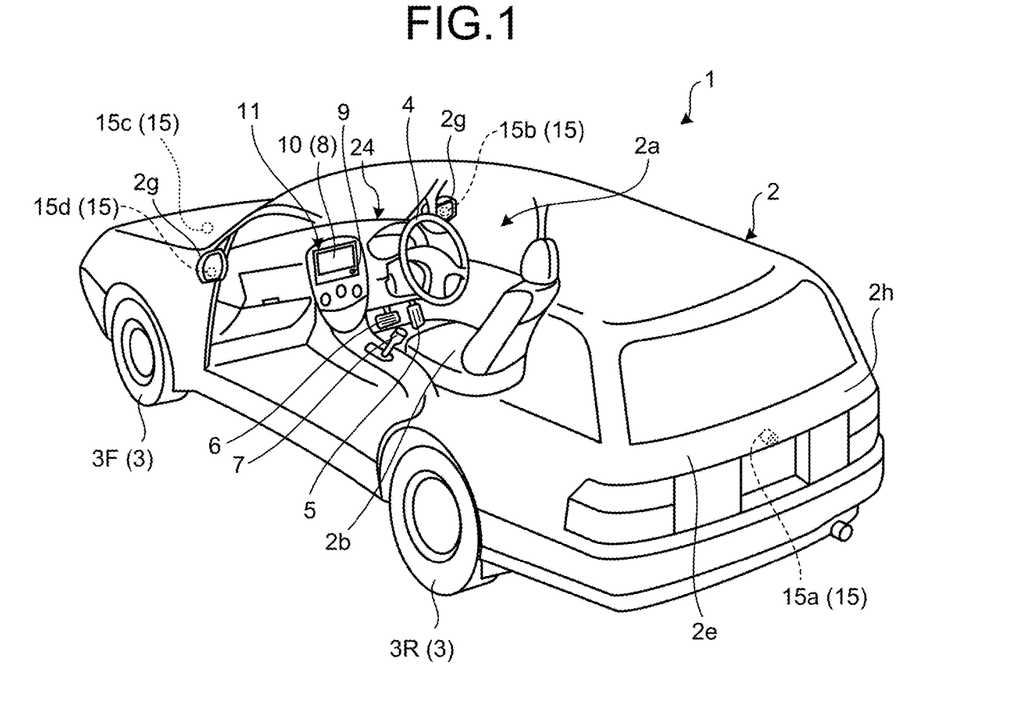

FIG. 1 is a perspective view illustrating an example of a state in which a part of a passenger compartment of the vehicle provided with the periphery monitoring device according to a first embodiment of the present invention is viewed through. As illustrated in FIG. 1, a vehicle 1 includes a vehicle body 2, a steering unit 4, an acceleration operation unit 5, a braking operation unit 6, a gear shift operation unit 7, and a monitor device 11. The vehicle body 2 includes a passenger compartment 2a in which a passenger rides. The passenger compartment 2a is provided therein with, for example, the steering unit 4, the acceleration operation unit 5, the braking operation unit 6, and the gear shift operation unit 7 in a state in which a driver as the passenger is seated in a seat 2b. The steering unit 4 is, for example, a steering wheel projecting from a dashboard 24. The acceleration operation unit 5 is, for example, an accelerator pedal located near a foot of the driver. The braking operation unit 6 is, for example, a brake pedal located near the foot of the driver. The gear shift operation unit 7 is, for example, a shift lever projecting from a center console.

The monitor device 11 is provided, for example, at a central part in a vehicle width direction (that is, a right-left direction) of the dashboard 24. The monitor device 11 may have a function of, for example, a navigation system or an audio system. The monitor device 11 includes a display 8, a voice output device 9, and an operation input unit 10. The monitor device 11 may include various types of operation input units, such as switches, dials, joysticks, and push-buttons.

The display 8 is constituted by, for example, a liquid crystal display (LCD) or an organic electroluminescent display (OELD), and can display various images based on image data. The voice output device 9 is constituted by, for example, a speaker, and outputs various voices based on voice data. The voice output device 9 may be provided in a different position in the passenger compartment 2a other than the monitor device 11.

The operation input unit 10 is constituted by, for example, a touchscreen panel, and allows the passenger to enter various types of information. The operation input unit 10 is provided on a display screen of the display 8, and allows the images displayed on the display 8 to be viewed through. With this configuration, the operation input unit 10 allows the passenger to view the images displayed on the display screen of the display 8. The operation input unit 10 detects a touch operation of the passenger on the display screen of the display 8 to receive an input of each of the various types of information by the passenger.

Figure 2:
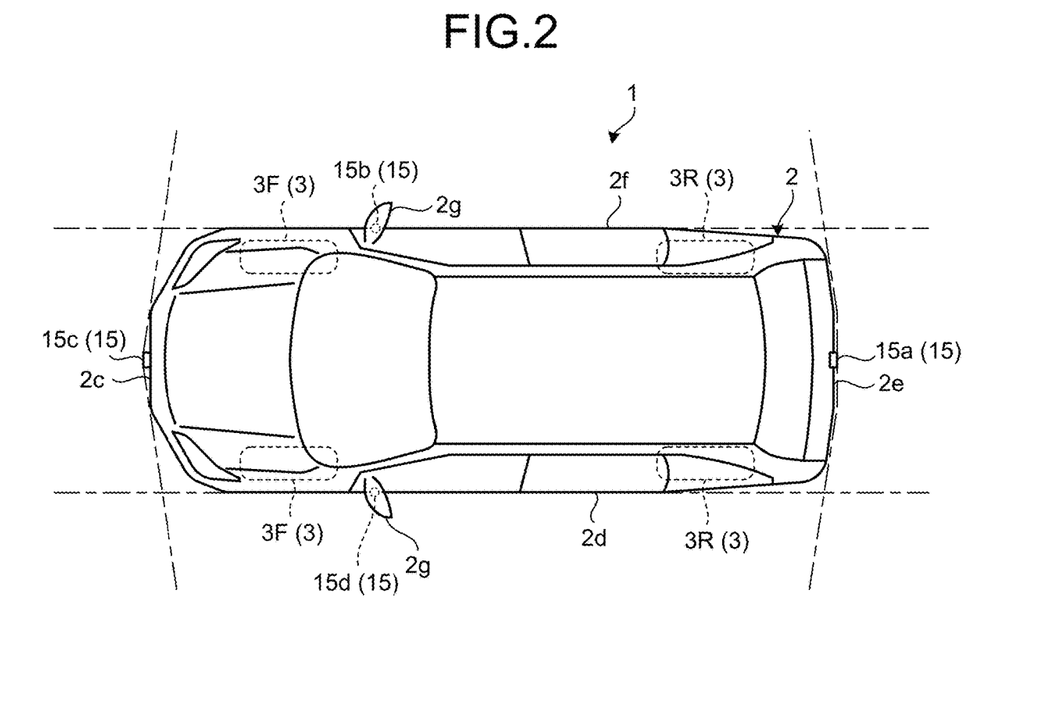
FIG. 2 is a plan view of an example of the vehicle according to the first embodiment.

FIG. 2 is a plan view of an example of the vehicle according to the first embodiment. As illustrated in FIGS. 1 and 2, the vehicle 1 is, for example, a four-wheeled automobile, and includes two right and left front wheels 3F and two right and left rear wheels 3R. All or some of the four wheels 3 are steerable.

The vehicle 1 is provided with a plurality of imaging units 15. In the present embodiment, the vehicle 1 is provided with, for example, four imaging units 15a to 15d. The imaging units 15 are digital cameras each having an image pickup device, such as a charge-coupled device (CCD) or a complementary metal-oxide-semiconductor (CMOS) image sensor (CIS). The imaging units 15 can image a surrounding area of the vehicle 1 at a predetermined frame rate. The imaging units 15 output a captured image obtained by imaging the surrounding area of the vehicle 1. Each of the imaging units 15 includes a wide-angle lens or a fish-eye lens, and can image a range of, for example, 140 degrees to 220 degrees in the horizontal direction. An optical axis of the imaging unit 15 may be set obliquely downward.

Specifically, the imaging unit 15a is located, for example, at a rear end 2e of the vehicle body 2, and is provided at a wall below a rear window of a rear hatch door 2h. The imaging unit 15a can image an area behind the vehicle 1 out of the surrounding area of the vehicle 1. The imaging unit 15b is located, for example, at a right end 2f of the vehicle body 2, and is provided at a right door mirror 2g. The imaging unit 15b can image an area on a side of the vehicle 1 out of the surrounding area of the vehicle 1. The imaging unit 15c is located, for example, on a front side of the vehicle body 2, that is, at a front end 2c in a front-rear direction of the vehicle 1, and is provided, for example, at a front bumper or a front grill. The imaging unit 15c can image an area in front of the vehicle 1 out of the surrounding area of the vehicle 1. The imaging unit 15d is located, for example, on a left side, that is, at a left end 2d in the vehicle width direction of the vehicle body 2, and is provided at a left door mirror 2g. The imaging unit 15d can image an area on a side of the vehicle 1 out of the surrounding area of the vehicle 1.

Figure 3:
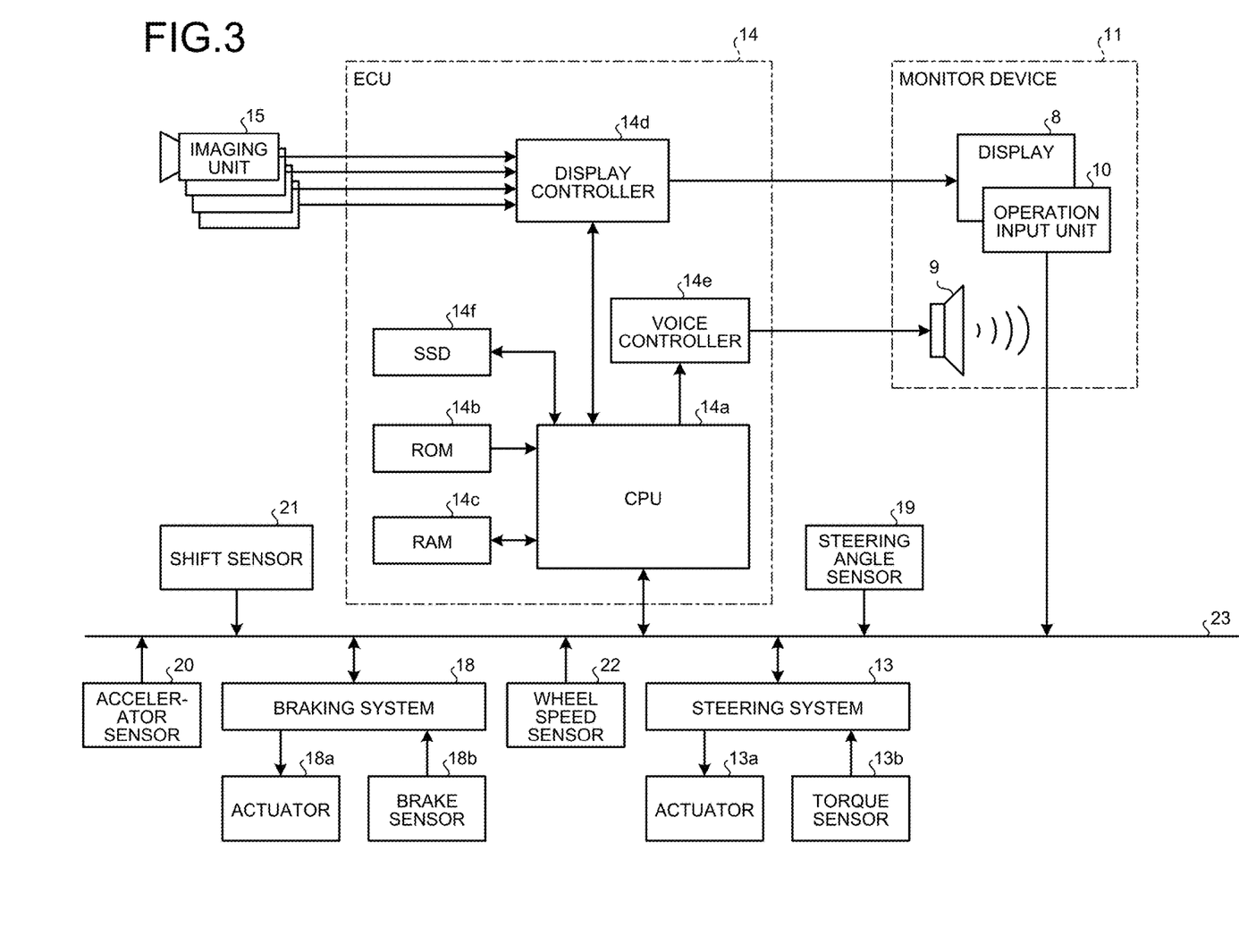
FIG. 3 is a block diagram illustrating an example of a functional configuration of the vehicle according to the first embodiment.

FIG. 3 is a block diagram illustrating an example of a functional configuration of the vehicle according to the first embodiment. As illustrated in FIG. 3, the vehicle 1 includes a steering system 13, a braking system 18, a steering angle sensor 19, an accelerator sensor 20, a shift sensor 21, wheel speed sensors 22, an in-vehicle network 23, and an electronic control unit (ECU) 14. The monitor device 11, the steering system 13, the braking system 18, the steering angle sensor 19, the accelerator sensor 20, the shift sensor 21, the wheel speed sensors 22, and the ECU 14 are electrically connected together through the in-vehicle network 23 serving as an electrical communication line. The in-vehicle network 23 is configured as, for example, a Controller Area Network (CAN).

The steering system 13 is, for example, an electric power steering system or a steer-by-wire (SBW) system. The steering system 13 includes an actuator 13a and a torque sensor 13b. The steering system 13 is electrically controlled by, for example, the ECU 14, and operates the actuator 13a to steer the wheels 3 by supplementing a steering force by adding torque to the steering unit 4. The torque sensor 13b detects torque applied to the steering unit 4 by the driver, and transmits the detection result to the ECU 14.

The braking system 18 includes an anti-lock braking system (ABS) that controls locking of brakes of the vehicle 1, an electronic stability control (ESC) that restrains sideslip of the vehicle 1 during cornering, an electric braking system that enhances braking forces to assist the brakes, and a brake-by-wire (BBW). The braking system 18 includes an actuator 18a and a brake sensor 18b. The braking system 18 is electrically controlled by, for example, the ECU 14, and applies the braking forces to the wheels 3 through the actuator 18a. The braking system 18 detects, for example, locking of a brake, free spin of any one of the wheels 3, or a sign of the sideslip based on, for example, a rotational difference between the right and left wheels 3, and performs control to restrain the locking of the brake, the free spin of the wheel 3, or the sideslip. The brake sensor 18b is a displacement sensor that detects a position of the brake pedal serving as a movable part of the braking operation unit 6, and transmits the detection result of the position of the brake pedal to the ECU 14.

The steering angle sensor 19 is a sensor that detects an amount of steering of the steering unit 4, such as the steering wheel. In the present embodiment, the steering angle sensor 19 that is constituted by, for example, a Hall element detects a rotational angle of a rotating part of the steering unit 4 as the amount of steering, and transmits the detection result to the ECU 14. The accelerator sensor 20 is a displacement sensor that detects a position of the accelerator pedal serving as a movable part of the acceleration operation unit 5, and transmits the detection result to the ECU 14.

The shift sensor 21 is a sensor that detects a position of a movable part (for example, a bar, an arm, or a button) of the gear shift operation unit 7, and transmits the detection result to the ECU 14. The wheel speed sensors 22 are sensors that each include, for example, a Hall element, and detect amounts of rotation of the wheels 3 or numbers of rotations of the wheels 3 per unit time, and transmit the detection results to the ECU 14.

The ECU 14 generates an image obtained by viewing a point of gaze in the surrounding area of the vehicle 1 from a virtual viewpoint based on the captured image obtained by imaging the surrounding area of the vehicle 1 using the imaging units 15, and displays the generated image on the display 8. The ECU 14 is constituted by, for example, a computer, and is in charge of overall control of the vehicle 1 through cooperation between hardware and software. Specifically, the ECU 14 includes a central processing unit (CPU) 14a, a read-only memory (ROM) 14b, a random access memory (RAM) 14c, a display controller 14d, a voice controller 14e, and a solid-state drive (SSD) 14f. The CPU 14a, the ROM 14b, and the RAM 14c may be provided on the same circuit board.

The CPU 14a reads a computer program stored in a nonvolatile storage device, such as the ROM 14b, and executes various types of arithmetic processing according to the computer program. The CPU 14a executes, for example, image processing on image data to be displayed on the display 8, and calculation of a distance to an obstacle present in the surrounding area of the vehicle 1.

The ROM 14b stores therein various computer programs and parameters required for executing the computer programs. The RAM 14c temporarily stores therein various types of data used in the arithmetic processing by the CPU 14a. The display controller 14d mainly executes, among the arithmetic processing operations in the ECU 14, for example, image processing on image data acquired from the imaging units 15 and to be output to the CPU 14a, and conversion of image data acquired from the CPU 14a into display image data to be displayed on the display 8. The voice controller 14e mainly executes, among the arithmetic processing operations in the ECU 14, processing of a voice acquired from the CPU 14a and to be output to the voice output device 9. The SSD 14f is a rewritable nonvolatile storage device, and keeps storing data acquired from the CPU 14a even after power supply to the ECU 14 is turned off.

Figure 4:
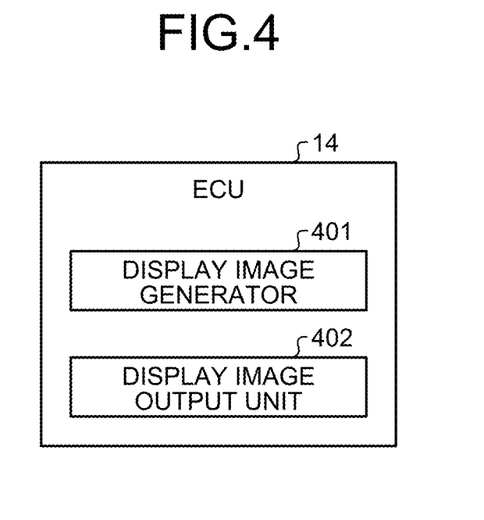
FIG. 4 is a block diagram illustrating an example of a functional configuration of an electronic control unit (ECU) included in the vehicle according to the first embodiment.

FIG. 4 is a block diagram illustrating an example of a functional configuration of the ECU included in the vehicle according to the first embodiment. As illustrated in FIG. 4, the ECU 14 includes a display image generator 401 and a display image output unit 402. For example, a processor, such as the CPU 14a mounted on the circuit board, executes a computer program for periphery monitoring stored in a storage medium, such as the ROM 14b or the SSD 14f, and thus, the ECU 14 performs functions of the display image generator 401 and the display image output unit 402. A part or the whole of the display image generator 401 and the display image output unit 402 may be configured as hardware, such as a circuit.

The display image generator 401 acquires, from the imaging units 15, the captured image obtained by imaging the surrounding area of the vehicle 1 in a position (hereinafter, called "past position") of the vehicle 1 at a certain time (hereinafter, called "past time") using the imaging units 15. Then, the display image generator 401 generates, based on the acquired captured image, the display image being capable of visualizing a positional relation between the vehicle 1 and the obstacle present in the surrounding area of the vehicle 1.

Specifically, based on the acquired captured image, the display image generator 401 generates, as the display image, the image obtained by viewing the point of gaze in a virtual space around the vehicle 1 from the virtual viewpoint received through the operation input unit 10. The virtual space is a space around the vehicle 1 in the past position, and is a space in which a vehicle image is provided in a position (for example, the current position) of the vehicle 1 at a time (for example, the current time) after the past time. The vehicle image is a three-dimensional image of the vehicle 1. In the present embodiment, the vehicle image is the three-dimensional image of the vehicle 1 allowing viewing therethrough the space around the vehicle 1 in the past position. This image allows viewing therethrough an image under a floor of the vehicle image in the virtual space. In the present embodiment, the vehicle image is the image allowing viewing therethrough the virtual space. However, the vehicle image is not limited thereto, and may be an opaque image (that is, an image not allowing viewing therethrough the virtual space).

In the present embodiment, the display image generator 401 pastes the acquired captured image to a three-dimensional plane (hereinafter, called "camera picture model") around the vehicle 1 in the past position to generate a space including the camera picture model as a space around the vehicle 1 in the past position. In the present embodiment, the display image generator 401 pastes the acquired captured image to the camera picture model around the vehicle 1 in the past position. However, the acquired captured image only needs to be pasted to a camera picture model around the vehicle 1. For example, the acquired captured image may be pasted to a camera picture model around the vehicle 1 in the current position. Then, the display image generator 401 generates, as the virtual space, a space in which the vehicle image is disposed corresponding to the current position of the vehicle 1 in the generated space. Thereafter, the display image generator 401 generates, as the display image, an image obtained by viewing the point of gaze in the generated virtual space from the virtual viewpoint received through the operation input unit 10.

In the present embodiment, each time a new virtual viewpoint is received through the operation input unit 10, the display image generator 401 regenerates the display image obtained by viewing the point of gaze in the virtual space from the new virtual viewpoint. The display image output unit 402 outputs the display image generated by the display image generator 401 to the display 8. As a result, an image of the obstacle included in the display image can be viewed simultaneously with the three-dimensional vehicle image, so that the positional relation between the vehicle 1 and the obstacle can be easily recognized.

Figure 5:
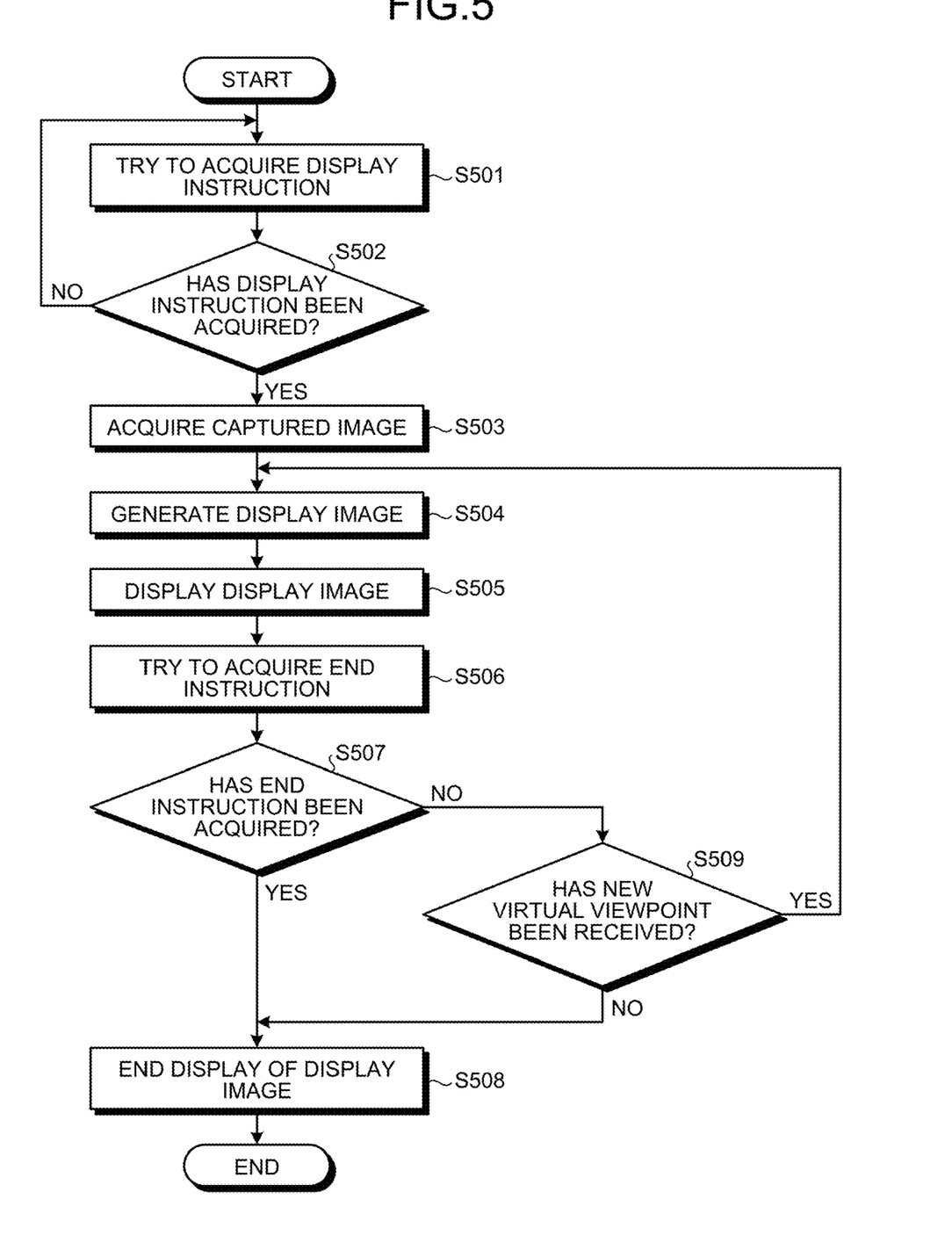
FIG. 5 is a flowchart illustrating an example of a flow of displaying processing of a display image performed by the vehicle according to the first embodiment.

The following describes an example of a flow of displaying processing of the display image performed by the vehicle 1 according to the present embodiment, with reference to FIG. 5. FIG. 5 is a flowchart illustrating the example of the flow of the displaying processing of the display image performed by the vehicle according to the first embodiment.

In the present embodiment, the display image generator 401 tries to acquire a display instruction for instructing to display a display image (Step S501). If the display instruction has been acquired (Yes at Step S502), the display image generator 401 acquires a captured image obtained by imaging the surrounding area of the vehicle 1 in the past position using the imaging units 15 (Step S503). For example, the display image generator 401 acquires the captured image obtained by imaging the surrounding area of the vehicle 1 using the imaging units 15 in a past position of the vehicle 1 at a past time earlier by a preset time (for example, several seconds) than the current time (or in a past position before the current position of the vehicle 1 by a preset distance (for example, 2 m)). In the present embodiment, the display image generator 401 acquires the captured image including an image corresponding to an area under the floor of the vehicle 1 in the current position. As a result, a display image including the image under the floor of the vehicle 1 in the current position can be generated, so that a situation under the floor of the vehicle 1 in the current position can be checked through the display 8.

Then, the display image generator 401 generates, based on the acquired captured image, the display image obtained by viewing the point of gaze in the virtual space from the virtual viewpoint received through the operation input unit 10 (Step S504). In the present embodiment, the display image generator 401 pastes the captured image obtained by imaging the surrounding area of the vehicle 1 in the past position using one of the imaging units 15 to the camera picture model. The display image generator 401 sets a space including the camera picture model as the virtual space. As a result, unlike in a case where a plurality of captured images obtained by imaging the surrounding area of the vehicle 1 using the imaging units 15 are pasted to the camera picture model, seams are prevented from being generated on the captured image pasted to the camera picture model, so that the positional relation between the vehicle 1 and the obstacle around the vehicle 1 can be more easily checked. In the present embodiment, the display image generator 401 generates the display image based on the image captured by one of the imaging units 15. However, the display image may be generated based on the images captured by the imaging units 15.

The display image output unit 402 outputs the display image generated by the display image generator 401 to the display 8 to display the display image on the display 8 (Step S505). Thereafter, the display image generator 401 tries to acquire an end instruction for ending the display of the display image (Step S506). If the end instruction has been acquired (Yes at Step S507), the display image output unit 402 stops outputting the display image to the display 8, and ends the display of the display image on the display 8 (Step S508).

If, instead, the end instruction has not been acquired (No at Step S507), the display image generator 401 determines whether a new virtual viewpoint has been received through the operation input unit 10 (Step S509). If a preset time has elapsed without receiving the new virtual viewpoint (No at Step S509), the display image output unit 402 stops outputting the display image to the display 8, and ends the display of the display image on the display 8 (Step S508). If the new virtual viewpoint has been received (Yes at Step S509), the display image generator 401 performs the processing at Step S504 again to regenerate the display image obtained by viewing the point of gaze in the virtual space from the new virtual viewpoint.

Figure 6:
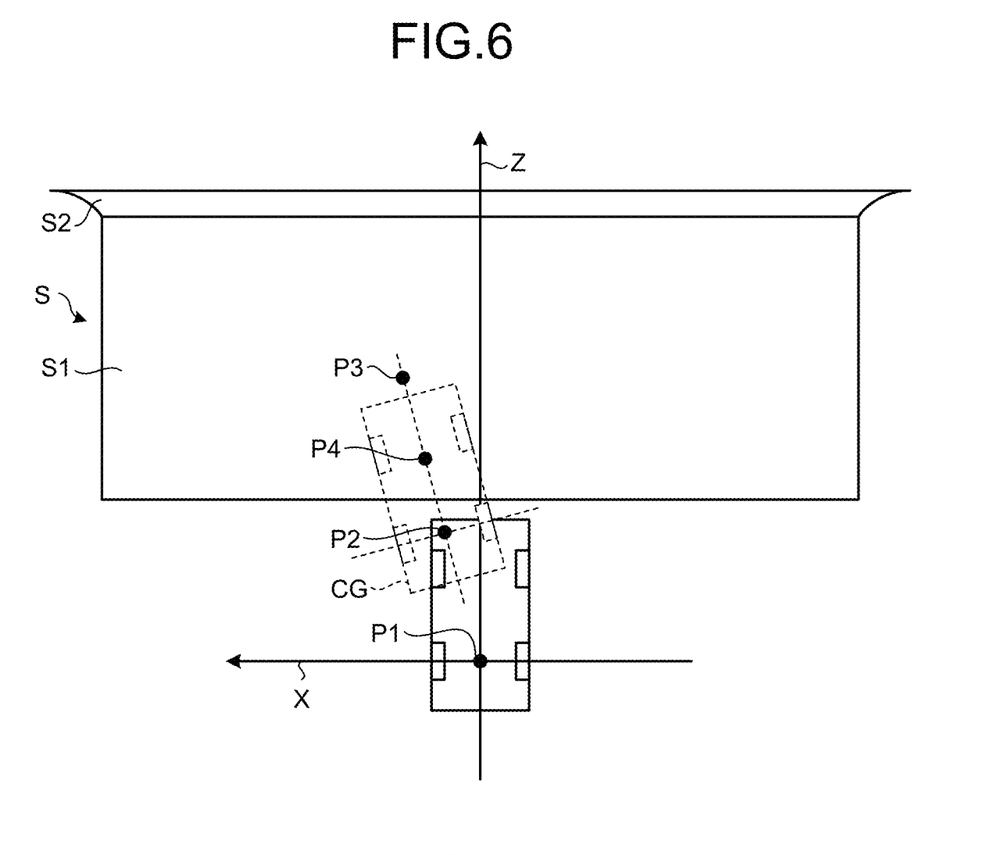
FIG. 6 is a diagram for explaining an example of a camera picture model used for generating the display image by the vehicle according to the first embodiment.
Figure 7:
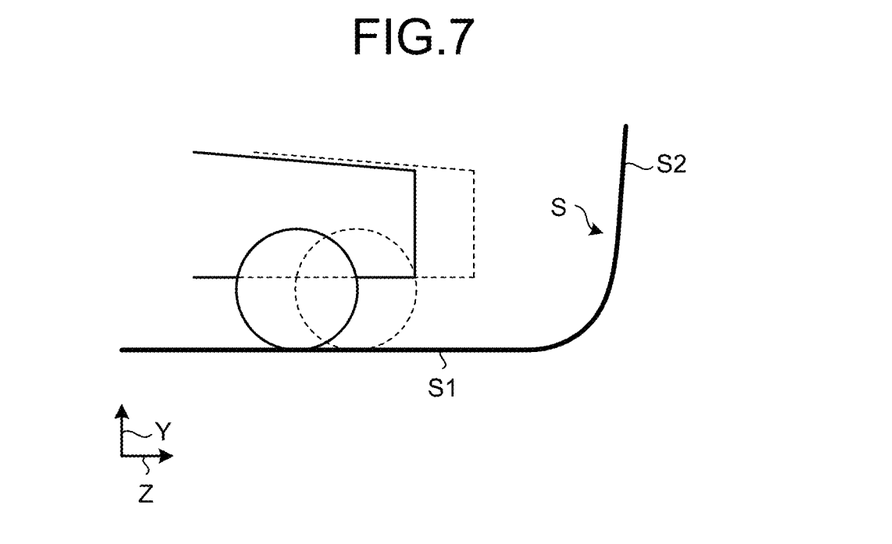
FIG. 7 is a diagram for explaining the example of the camera picture model used for generating the display image by the vehicle according to the first embodiment.
Figure 8:
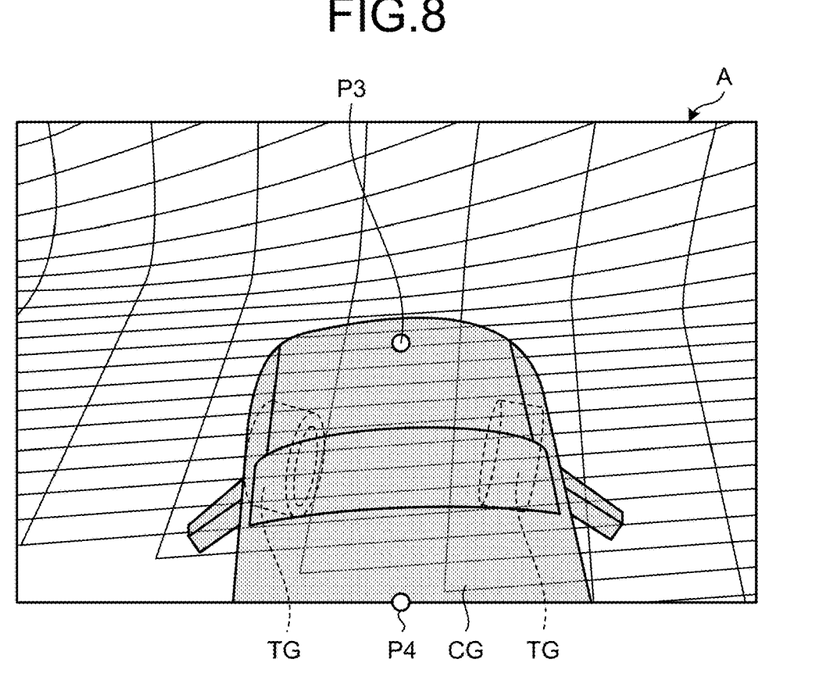
FIG. 8 is a diagram for explaining an example of the camera picture model and a vehicle image used for generating the display image in the vehicle according to the first embodiment.
Figure 9:
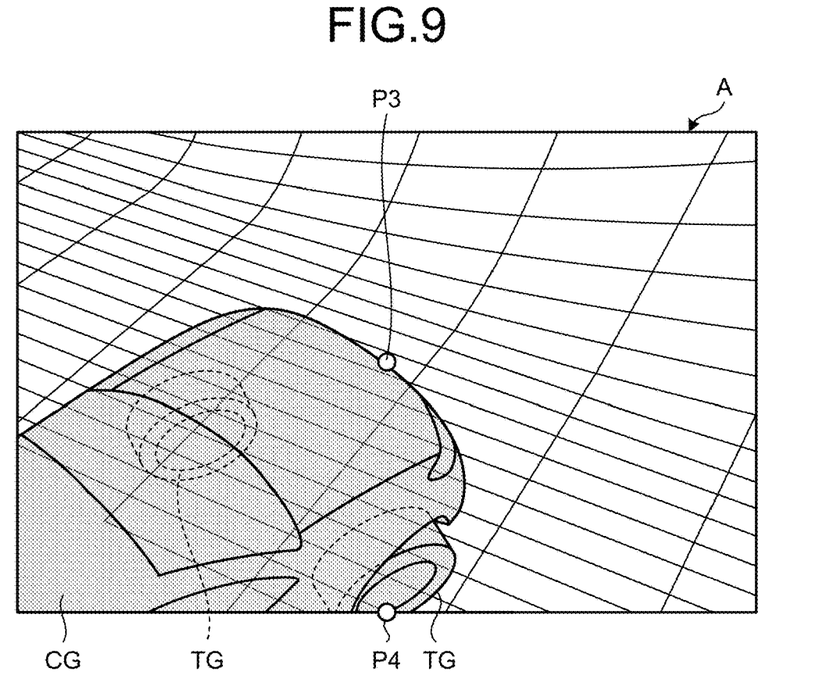
FIG. 9 is a diagram for explaining another example of the camera picture model and the vehicle image used for generating the display image in the vehicle according to the first embodiment.

The following describes generation processing of the display image performed by the vehicle 1 according to the present embodiment, with reference to FIGS. 6 to 9. FIGS. 6 and 7 are diagrams for explaining an example of the camera picture model used for the generation of the display image by the vehicle according to the first embodiment. In FIGS. 6 and 7, a Z-direction denotes a direction parallel to a surface (road surface) of contact of a tire of the vehicle 1; an X-direction denotes a direction parallel to the surface of contact of the tire of the vehicle 1 and orthogonal to the Z-direction; and a Y-direction denotes a direction orthogonal to the surface of contact. FIGS. 8 and 9 are each a diagram for explaining an example of the camera picture model and the vehicle image used for the generation of the display image in the vehicle according to the first embodiment.

In the present embodiment, as illustrated in FIGS. 6 and 7, the display image generator 401 generates in advance a camera picture model S including a first plane S1 and a second plane S2. In the present embodiment, the first plane S1 is a flat plane corresponding to the road surface on which the vehicle 1 is present. For example, the first plane S1 is a flat oval plane. The second plane S2 is a curved plane that is provided so as to continue from an outer side (outer edge) of the first plane S1 and gradually rises toward the Y-direction as being away from the first plane S1 with respect to the first plane S1. The second plane S2 is, for example, a curved plane rising from the outer side of the first plane S1 toward the Y-direction in an elliptical shape or a parabolic shape. In other words, the display image generator 401 generates a bowl-shaped or cylindrical three-dimensional plane as the camera picture model S.

In the present embodiment, the display image generator 401 generates a three-dimensional pasting plane including the flat first plane S1 and the curved second plane S2 as the camera picture model S. However, the display image generator 401 is not limited to this example as long as generating a three-dimensional pasting plane as the camera picture model S. For example, the display image generator 401 may generate, as the camera picture model S, a three-dimensional pasting plane including the flat first plane S1 and the flat-surfaced second plane S2 that rises from an outer side of the first plane S1 vertically or gradually with respect to the first plane S1.

Then, the display image generator 401 pastes the captured image obtained by imaging the surrounding area of the vehicle 1 using the imaging unit 15 in a past position P1 to the camera picture model S. In the present embodiment, the display image generator 401 creates in advance a coordinate table that associates coordinates (hereinafter, called "three-dimensional coordinates") of points (hereinafter, called "pasting points") in the camera picture model S represented in a world coordinate system having an origin in the past position P1 with coordinates (hereinafter, called "camera picture coordinates") of points (hereinafter, called "camera picture points") in the captured image to be pasted to the pasting points of the three-dimensional coordinates. Then, the display image generator 401 pastes the camera picture points in the captured image to the pasting points of the three-dimensional coordinates associated with the camera picture coordinates of the camera picture points in the coordinate table. In the present embodiment, the display image generator 401 creates the coordinate table each time the internal combustion engine or the electric motor of the vehicle 1 starts.

Thereafter, the display image generator 401 disposes the camera picture model S with the captured image pasted thereto in the space around the vehicle 1 in the past position P1. In addition, as illustrated in FIGS. 8 and 9, the display image generator 401 generates, as a virtual space A, a space in which a vehicle image CG is disposed corresponding to a current position P2 of the vehicle 1 in the space. After generating the virtual space A, the display image generator 401 sets, as a point of gaze P3, a point vertically, to the first plane S1, below a front end of the vehicle image CG provided corresponding to the current position P2 of the vehicle 1 in the virtual space A, as illustrated in FIG. 6. Then, as illustrated in FIGS. 6, 8, and 9, the display image generator 401 generates a display image obtained by viewing the point of gaze P3 from a virtual viewpoint P4 received from the operation input unit 10. As a result, the image of the obstacle included in the display image can be viewed simultaneously with the three-dimensional vehicle image CG, so that the positional relation between the vehicle 1 and the obstacle can be easily recognized.

In the present embodiment, as illustrated in FIGS. 8 and 9, the display image generator 401 adjusts transmittance of the vehicle image CG, and then disposes the vehicle image CG in the virtual space A so as to allow the captured image pasted to the camera picture model S to be viewed through the vehicle image CG. At that time, the display image generator 401 includes, in the vehicle image CG, images (hereinafter, called "wheel images") TG of the wheels in a display mode allowing three-dimensional outlines thereof to be visible through the image of the vehicle included in the vehicle image CG. For example, the display image generator 401 sets the transmittance of a portion other than the wheel images TG in the vehicle image CG (for example, an image of the vehicle body) higher than that of the wheel images TG. As a result, as illustrated in FIGS. 8 and 9, since the wheel images TG included in the display image can be prevented from being made invisible by the portion other than the wheel images TG in the vehicle image CG, the positional relation between the vehicle image CG and the obstacle in the display image can be easily recognized based on the wheel images TG.

In the present embodiment, the display image generator 401 acquires the amount of steering of the vehicle 1 in the current position P2 from the steering angle sensor 19. As illustrated in FIGS. 8 and 9, the display image generator 401 generates, as the virtual space A, a space including the vehicle image CG including the wheel images TG rotated by a steer angle corresponding to the acquired amount of steering. As a result, the steer angle of the wheels of the vehicle 1 can be recognized based on the wheel images TG included in the display image. Therefore, whether the vehicle 1 will contact the obstacle if the vehicle 1 travels at the current steer angle can be easily understood. The display image generator 401 may set the transmittance of the wheel images TG to transmittance allowing viewing of images of the road surface located in positions where the wheel images TG are present in the virtual space A. As a result, states of the road surface being contacted by the wheels of the vehicle 1 can be understood.

In the present embodiment, the display image generator 401 may acquire the numbers of rotations of the wheels 3 from the wheel speed sensors 22, and rotate the wheel images TG according to the acquired numbers of rotations of the wheels 3. With this configuration, the vehicle image CG moves while the wheel images TG rotate in the display image. Therefore, the passenger of the vehicle 1 can be prevented from feeling discomfort unlike in a state in which the vehicle image CG moves without the rotation of the wheel images TG.

In the present embodiment, as illustrated in FIGS. 8 and 9, the display image generator 401 provides, as the vehicle image CG, the image representing the three-dimensional image of the vehicle 1 as planes in the virtual space A. However, any image capable of visualizing the three-dimensional shape of the vehicle 1 may be provided as the vehicle image CG in the virtual space A. For example, the display image generator 401 may provide a wire-frame model representing the three-dimensional shape of the vehicle 1 using contour lines as the vehicle image CG in the virtual space A. This configuration can prevent the wheel images TG from being made invisible by a portion other than the wheel images TG in the vehicle image CG. Therefore, the positional relation between the vehicle image CG and the obstacle in the display image can be easily recognized based on the wheel images TG.

If the display 8 displays, without any modification, an image in the virtual space A including the camera picture model S to which a captured image obtained by imaging the surrounding area of the vehicle 1 (for example, the area in front of the vehicle 1) in the past position P1 using a wide-angle camera (for example, a camera having an angle of view of 180 degrees) is pasted, an image of the vehicle 1 (for example, an image of a front bumper of the vehicle 1) included in the captured image may be included in the display image, giving the passenger of the vehicle 1 an uncomfortable feeling. In contrast, in the present embodiment, the display image generator 401 can prevent the image of the vehicle 1 included in the captured image from being included in the display image, by providing the camera picture model S at a gap from the past position P1 of the vehicle 1 toward the outside of the vehicle 1. Therefore, the passenger of the vehicle 1 can be prevented from feeling discomfort.

Figure 10:
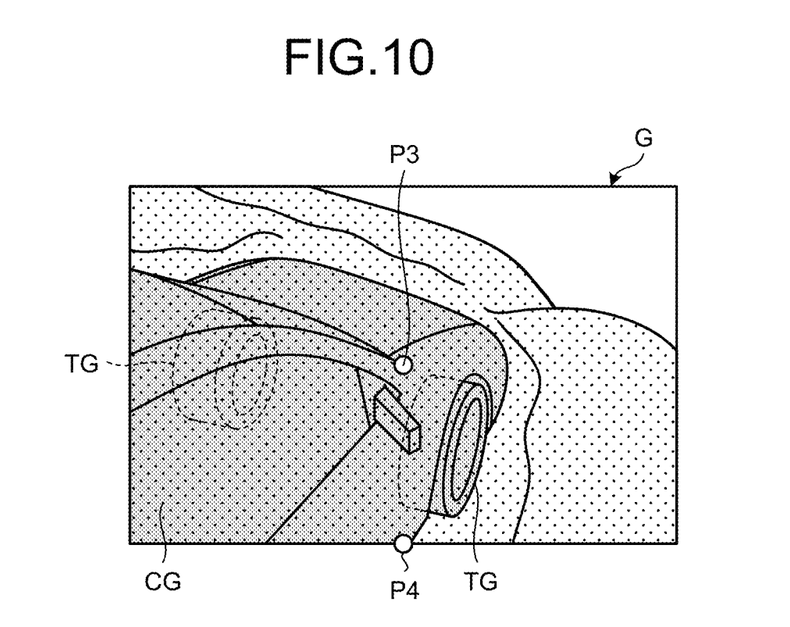
FIG. 10 is a diagram illustrating an example of the display image generated in the vehicle according to the first embodiment.
Figure 11:
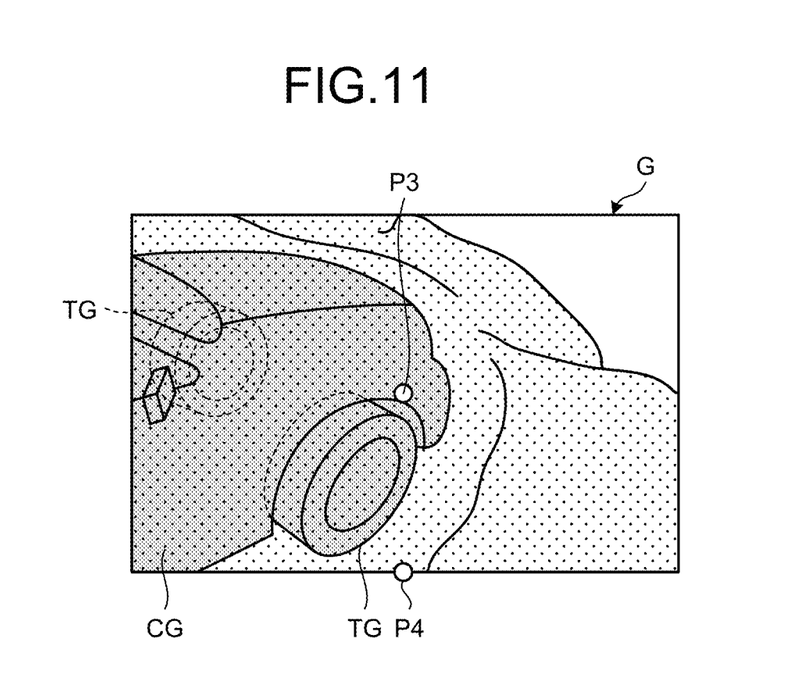
FIG. 11 is a diagram illustrating another example of the display image generated in the vehicle according to the first embodiment.
Figure 12:
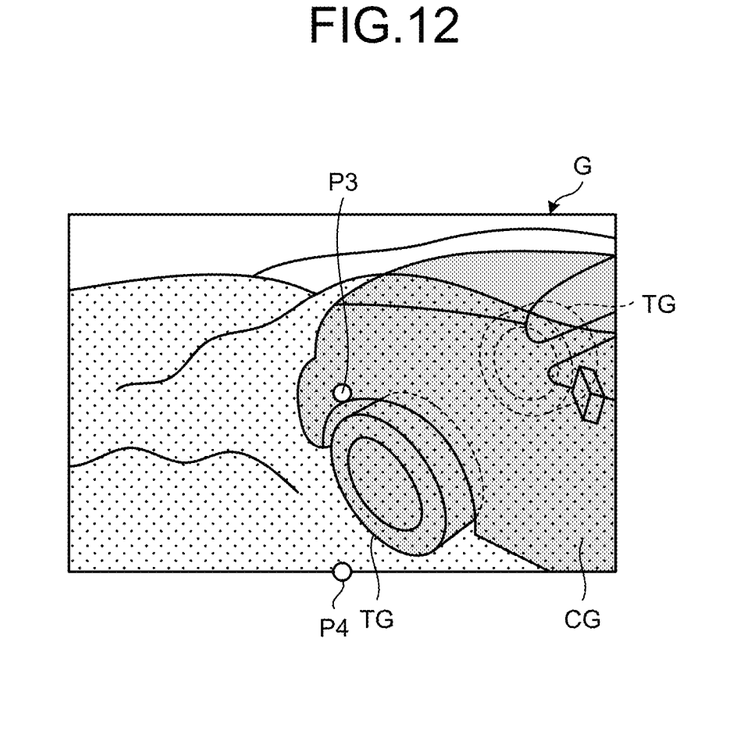
FIG. 12 is a diagram illustrating still another example of the display image generated in the vehicle according to the first embodiment.

The following describes examples of the display image generated in the vehicle 1 according to the present embodiment, with reference to FIGS. 10 to 12. FIGS. 10 to 12 are diagrams illustrating the examples of the display image generated in the vehicle according to the first embodiment.

As illustrated in FIG. 10, the display image output unit 402 outputs a display image G generated by the display image generator 401 to the display 8 to display the display image G on the display 8. Thereafter, if the passenger of the vehicle 1 instructs a movement of the virtual viewpoint P4 rightward from the center of the vehicle image CG in the vehicle width direction of the vehicle image CG by, for example, flicking the display screen of the display 8 displaying the display image G illustrated in FIG. 10, the display image generator 401 generates, as the display image G, an image obtained by viewing the point of gaze P3 from the virtual viewpoint P4 that has moved rightward from the center of the vehicle image CG in the vehicle width direction of the vehicle image CG, as illustrated in FIG. 11. In the present embodiment, as illustrated in FIGS. 10 and 11, the display image generator 401 generates the display image G so as to locate the position of the point of gaze P3 in the display image G at the center in the display image G.

If, instead, the passenger of the vehicle 1 instructs a movement of the virtual viewpoint P4 leftward from the center of the vehicle image CG in the vehicle width direction of the vehicle image CG by flicking the display screen of the display 8, the display image generator 401 generates, as the display image G, an image obtained by viewing the point of gaze P3 from the virtual viewpoint P4 that has moved leftward from the center of the vehicle image CG in the vehicle width direction of the vehicle image CG, as illustrated in FIG. 12. As a result, the display image G can be displayed that is obtained by viewing the positional relation between the vehicle image CG and the obstacle from various angles, so that the positional relation between the vehicle 1 and the obstacle can be more easily recognized.

As described above, the vehicle 1 according to the first embodiment allows the image of the obstacle included in the display image to be viewed simultaneously with the three-dimensional vehicle image, so that the positional relation between the vehicle 1 and the obstacle can be easily recognized.

Second Embodiment

A second embodiment is an example in which the captured image obtained by imaging the surrounding area of the vehicle in the past position is pasted to the camera picture model represented in a world coordinate system having an origin in the current position of the vehicle. In the following description, the same configuration as that of the first embodiment will not be described.

Figure 13:
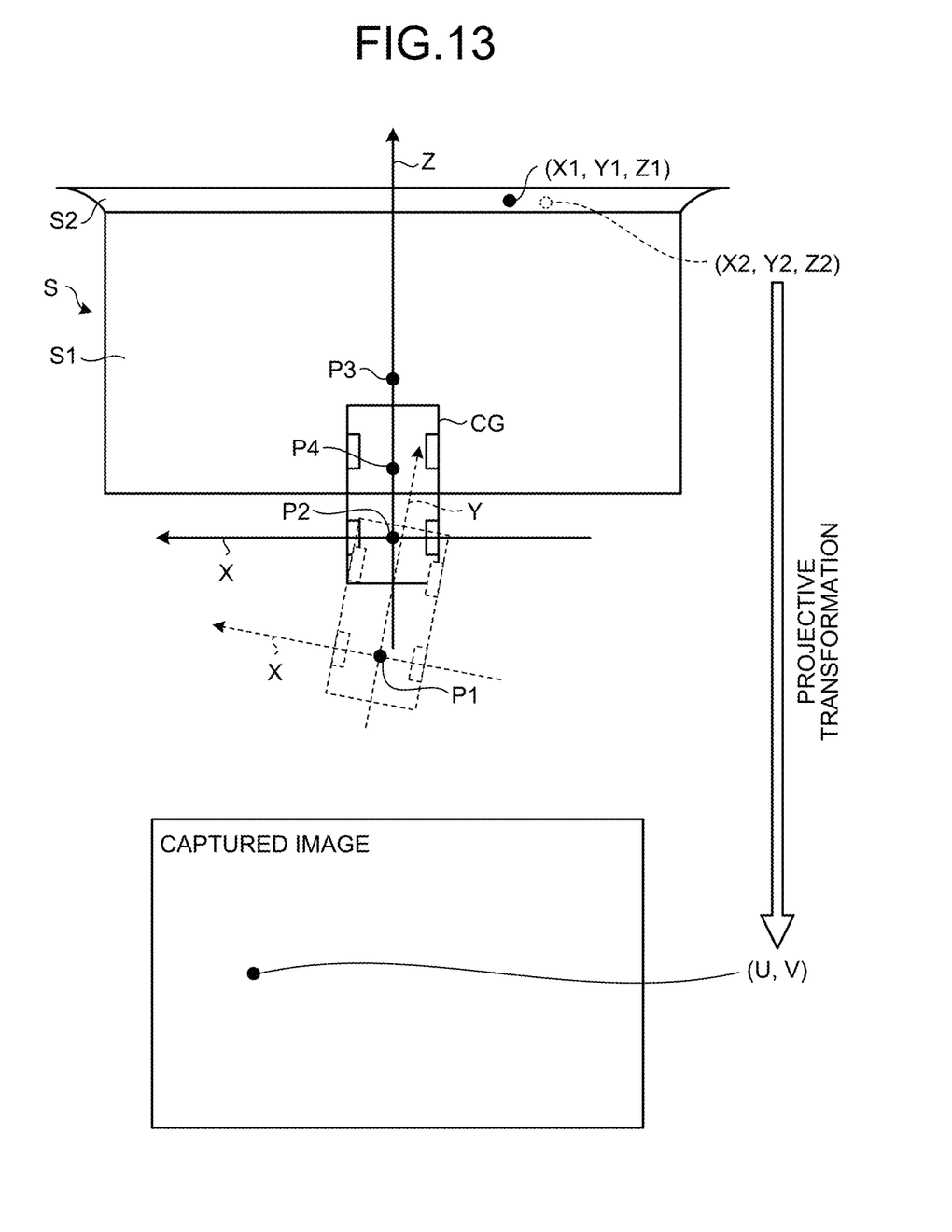
FIG. 13 is a diagram for explaining an example of generation processing of a virtual space performed by a vehicle according to a second embodiment of the present invention.

FIG. 13 is a diagram for explaining an example of generation processing of the virtual space performed by a vehicle according to the second embodiment. In FIG. 13, the Z-direction denotes the direction parallel to the surface (road surface) of contact of the tire of the vehicle 1; the X-direction denotes the direction parallel to the surface of contact of the tire of the vehicle 1 and orthogonal to the Z-direction; and the Y-direction denotes the direction orthogonal to the surface of contact. As illustrated in FIG. 13, the display image generator 401 generates in advance the camera picture model S including the first plane S1 and the second plane S2 in the same way as in the first embodiment.

The display image generator 401 acquires the past position P1 and a traveling direction (azimuth) of the vehicle 1 in the past position P1. Then, the display image generator 401 obtains an azimuth difference serving as a difference between the traveling direction (azimuth) of the vehicle 1 in the past position P1 and the traveling direction (azimuth) of the vehicle 1 in the current position P2, and an own-vehicle position difference serving as a difference between the past position P1 and the current position P2. In addition, based on the obtained azimuth difference and the own-vehicle position difference, the display image generator 401 rotates and translates three-dimensional coordinates (X1,Y1,Z1) of each point in the camera picture model S represented in the world coordinate system having the origin in the current position P2 so as to convert the three-dimensional coordinates (X1,Y1,Z1) into three-dimensional coordinates (X2,Y2,Z2) in the world coordinate system having the origin in the past position P1, as illustrated in FIG. 13.

Furthermore, as illustrated in FIG. 13, the display image generator 401 projectively transforms the three-dimensional coordinates (X2,Y2,Z2) represented in the world coordinate system having the origin in the past position P1 to obtain camera picture coordinates (U,V) of a camera picture point to be pasted to the three-dimensional coordinates (X2,Y2,Z2). The display image generator 401 pastes the camera picture point at the obtained camera picture coordinates (U,V) to a pasting point at the three-dimensional coordinates (X1,Y1,Z1) represented in the world coordinate system having the origin in the current position P2. Thus, the display image generator 401 pastes the captured image obtained by imaging the surrounding area of the vehicle 1 in the past position P1 to the camera picture model S represented in the world coordinate system having the origin in the current position P2 of the vehicle 1.

As described above, the vehicle 1 according the second embodiment can obtain the same operational advantage as that in the first embodiment.

Third Embodiment

A third embodiment is an example in which an outline of a vehicle image obtained when the vehicle image is viewed from above in the virtual space is disposed in the virtual space. In the following description, the same configuration as that of the first embodiment will not be described.

Figure 14:
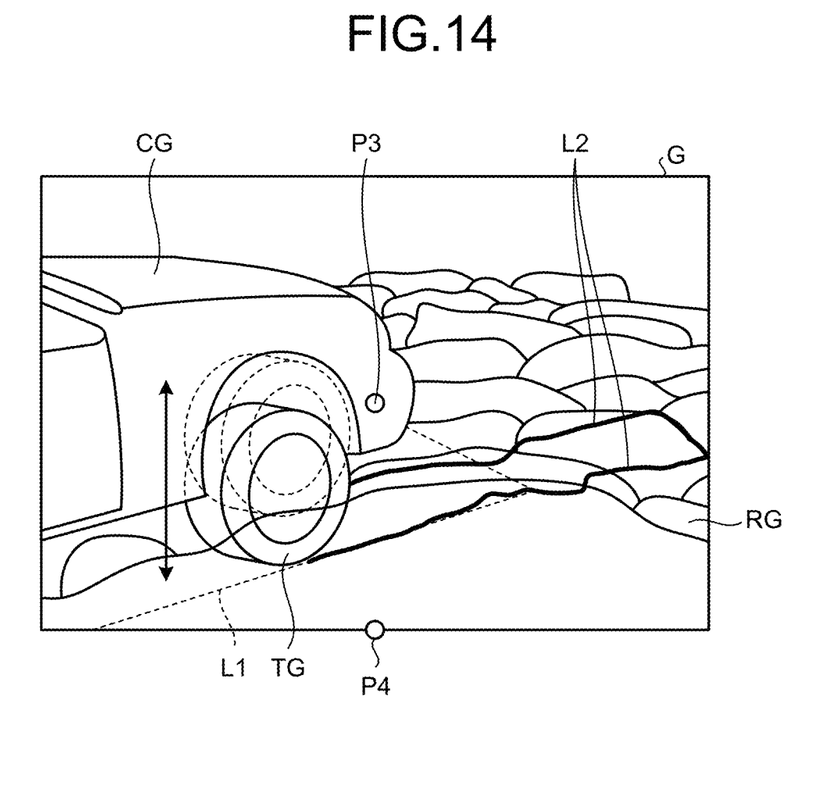
FIG. 14 is a diagram illustrating an example of a display image generated by a vehicle according to a third embodiment of the present invention.

FIG. 14 is a diagram illustrating an example of a display image generated by a vehicle according to the third embodiment. In the present embodiment, the display image generator 401 disposes, in the virtual space, an outline L1 (for example, a dashed line) of the vehicle image obtained when the vehicle image is viewed from above in the virtual space. Specifically, the display image generator 401 obtains, as the outline L1, an outline of an image obtained by projecting the vehicle image on the first plane S1 of the camera picture model S. The display image generator 401 disposes the obtained the outline L1 in the first plane S1. This operation can include the outline L1 also in the display image G, as illustrated in FIG. 14, and allows the image of the obstacle included in the display image G to be viewed simultaneously with the position of the planar vehicle image CG, so that the positional relation between the vehicle 1 and the obstacle can be more easily recognized.

In the present embodiment, if a stereo camera capable of detecting a distance between the road surface present around the vehicle 1 and the vehicle body 2 is included as the imaging unit 15, the display image generator 401 obtains, based on the distance detected by the stereo camera, trajectory lines L2 (hereinafter, called "predicted trajectory lines") along which the wheels 3 will pass from the current time until a later time. As illustrated in FIG. 14, the display image generator 401 may superimpose the obtained predicted trajectory lines L2 on an image of the road surface (hereinafter, called "road surface image") RG in the display image G. As a result, a road surface condition of the road surface to be travelled by the vehicle 1 can be viewed, so that circumstances around the vehicle 1 can be more easily recognized. In the present embodiment, the stereo camera detects the distance between the road surface present around the vehicle 1 and the vehicle body 2. However, the present invention is not limited to this example. For example, a laser radar or the like may detect the distance between the road surface present around the vehicle 1 and the vehicle body 2.

In the present embodiment, the display image generator 401 superimposes the predicted trajectory lines L2 on the display image G. However, any image capable of visualizing irregularity of the road surface present around the vehicle 1 may be included in the display image G. For example, according to the distance between the road surface present around the vehicle 1 and the vehicle body 2 detected by, for example, the stereo camera or the laser radar, the display image generator 401 may superimpose hatching (for example, semi-transparent hatching) capable of visualizing the irregularity of the road surface present around the vehicle 1 on the display image G, or may emphasize shading of the road surface image RG in the display image G. Alternatively, the display image generator 401 may provide irregularity corresponding to the irregularity of the road surface present around the vehicle 1 in the first plane S1 of the camera picture model S.

In addition, in the present embodiment, the display image generator 401 detects a stroke of a suspension included in the vehicle 1 using a stroke sensor provided at the suspension. The display image generator 401 may dispose a vehicle image capable of visualizing the detected stroke in the virtual space. As a result, the road surface condition of the road surface to be travelled by the vehicle 1 can be viewed, so that the circumstances around the vehicle 1 can be more easily recognized.

Specifically, the display image generator 401 changes a distance between the image of the vehicle body and a wheel image included in the vehicle image in the virtual space according the detected stroke. For example, if one of the wheels 3 of the vehicle 1 is located on a recess of the road surface and the detected stroke is longer than a preset stroke, the display image generator 401 sets the distance between the image of the vehicle body and the wheel image included in the vehicle image larger than a preset distance. As a result, as illustrated in FIG. 14, if the wheel 3 of the vehicle 1 is located on the recess of the road surface, the distance between the image of the vehicle body and one of the wheel images TG (wheel image TG indicated by solid lines) included in the vehicle image CG can be increased so as to indicate that the wheel 3 is located on the recess. Therefore, the circumstances around the vehicle 1 can be more easily recognized.

If the wheel of the vehicle 1 is located on a projection of the road surface and the detected stroke is shorter than the preset stroke, the display image generator 401 sets the distance between the image of the vehicle body and the wheel image included in the vehicle image smaller than the preset distance. As a result, as illustrated in FIG. 14, if the wheel 3 of the vehicle 1 is located on the projection of the road surface, the distance between the image of the vehicle body and the wheel image TG (wheel image TG indicated by dashed lines) included in the vehicle image CG can be reduced so as to indicate that the wheel 3 is located on the projection. Therefore, the circumstances around the vehicle 1 can be more easily recognized.

As described above, the vehicle 1 according to the third embodiment allows the image of the obstacle included in the display image G to be viewed simultaneously with the vehicle image represented in a planar form, so that the positional relation between the vehicle 1 and the obstacle can be more easily recognized.

The invention claimed is:

1. A periphery monitoring device comprising:
a processor configured to:
generate a display image obtained by viewing, from a virtual viewpoint received through an operation input unit, a point of gaze in a virtual space including:
a model obtained by pasting a captured image obtained by imaging a surrounding area of a vehicle in a first position of the vehicle at a first time using imaging units provided on the vehicle to a three-dimensional plane around the vehicle, and
a three-dimensional vehicle image provided in a second position of the vehicle at a second time after the first time; and output the display image to a display,
wherein the second position of the vehicle comprises a rotation of wheels on the vehicle from the first position and a distance of the wheels from the vehicle determined by a stroke sensor on the vehicle.

2. The periphery monitoring device according to claim 1, wherein the vehicle image is an image allowing viewing therethrough the model.

3. The periphery monitoring device according to claim 1, wherein the captured image is obtained by imaging the surrounding area of the vehicle in the first position using one of the imaging units.

4. The periphery monitoring device according to claim 1, wherein the vehicle image is an image in which three-dimensional outlines of images of wheels included in the vehicle image are visible through an image of a vehicle body included in the vehicle image.

5. The periphery monitoring device according to claim 1, wherein the processor disposes, in the virtual space, an outline of the vehicle image obtained when the vehicle image is viewed from above in the virtual space.

6. The periphery monitoring device according to claim 4, wherein the processor acquires an amount of steering of the vehicle in the second position, and includes the images of the wheels rotated by an angle corresponding to the acquired amount of steering in the vehicle image.

7. The periphery monitoring device according to claim 1, wherein the captured image includes an image corresponding to an area under the floor of the vehicle in the second position.

* * * * *